Sept. 3, 1968  K. T. GUY  3,399,690
OVER PRESSURE CUTOFF
Filed Aug. 30, 1966  2 Sheets-Sheet 1
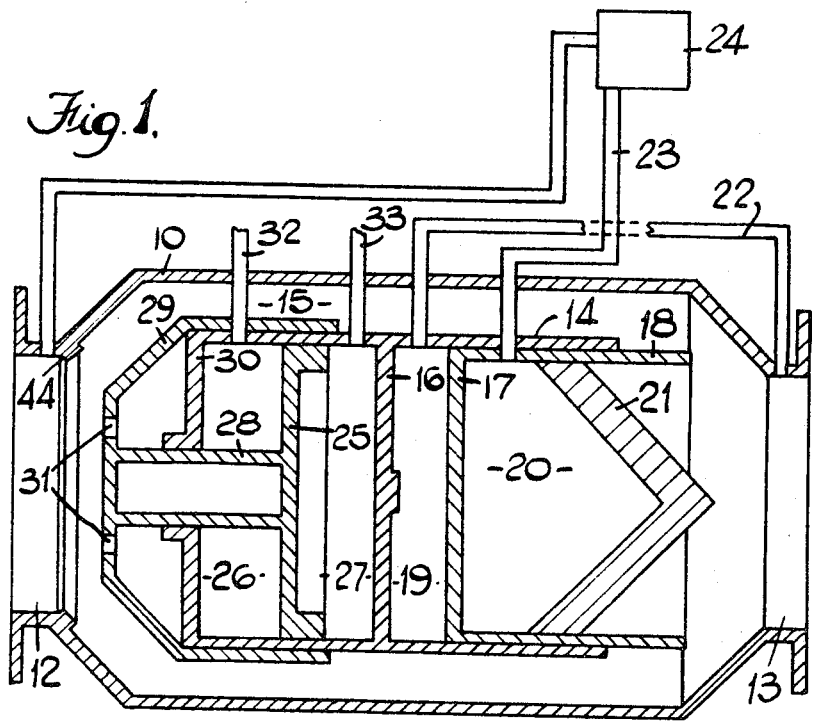
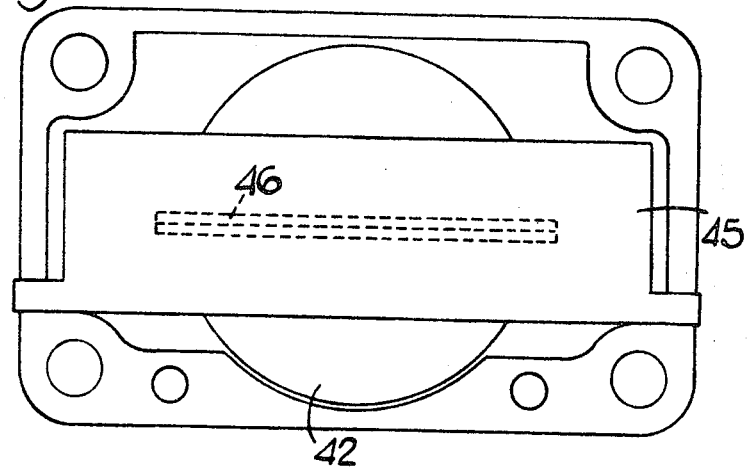

Sept. 3, 1968  K. T. GUY  3,399,690
OVER PRESSURE CUTOFF
Filed Aug. 30, 1966  2 Sheets-Sheet 2

United States Patent Office
3,399,690
Patented Sept. 3, 1968

3,399,690
OVER PRESSURE CUTOFF
Kenneth Theodore Guy, Ruislip, England, assignor to Rotax Limited, London, England
Filed Aug. 30, 1966, Ser. No. 576,018
6 Claims. (Cl. 137—220)

This invention relates to fluid control valves and has for its object to provide such a valve in a simple and convenient form.

A fluid control valve in accordance with the invention comprises, in combination, a casing, an inlet and an outlet defined at opposite ends of the casing, a pair of closure members mounted within the casing and slidable relative thereto to control the flow of fluid through the casing, a pair of double acting pistons operatively connected to said closure members respectively, first passage means through which fluid under pressure from downstream of the valve can be applied to one side of one of said pistons to move the associated closure member to reduce the flow of fluid through the casing, second passage means through which fluid at a predetermined pressure can be applied to the other side of said one piston, so that the magnitude of the pressure downstream of the valve is controlled in accordance with the magnitude of said predetermined pressure, valve means operable to control the application of fluid under pressure to one or the other side of said other piston whereby the associated closure member can be moved to permit or prevent the flow of fluid through the valve, resilient means biasing said valve means into one position in which the closure member associated with said other piston is in a position to permit the flow of fluid through the valve, first fluid pressure operable means responsive to pressure downstream of the valve, said first fluid pressure operable means being arranged the move said valve means to another position against the action of said resilient means when the pressure downstream of the valve exceeds a safe value, latch means operable when said valve means is moved to said other position to retain the valve means in this position, and operator controllable means operable for releasing said latch means.

In the accompanying drawings:

FIGURE 1 is a diagrammatic section of part of a valve in accordance with the invention.

Figure 2:
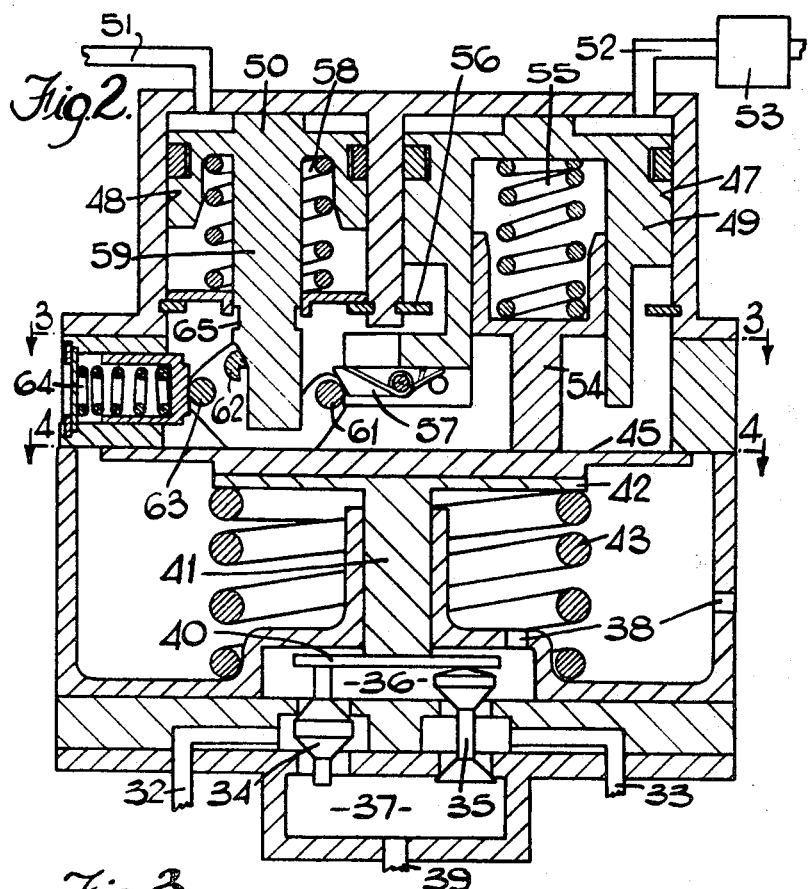
FIGURE 2 is a sectional side view of the remaining part of the valve.
Figure 3:
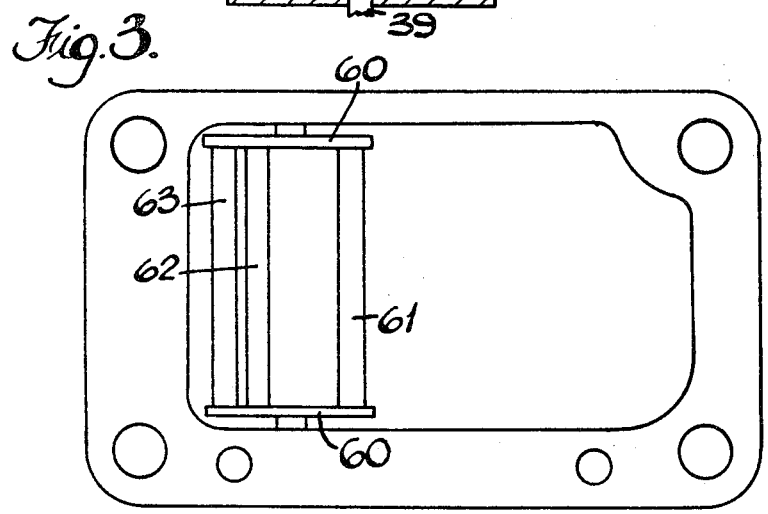

FIGURES 3 and 4 are sections on the lines 3—3 and 4—4 of FIGURE 2 respectively with parts removed for clarity.

Referring to the drawings there is provided a hollow cylindrical casing 10 which is tapered inwardly at its opposite ends respectively. The opposite ends of the casing are provided with flanges respectively whereby the casing can be connected in series with a conduit which conveys air under pressure. One end of the casing defines an inlet 12 and the opposite end an outlet 13.

Mounted within the casing is a hollow cylindrical body 14 which is of smaller diameter than the internal diameter of the casing so that an annular passage 15 is defined intermediate the casing and the body and through which air passes from the inlet to the outlet. Moreover the body 14 is divided into two compartments by a rigid circular baffle 16 disposed intermediate the ends of the body. Slidable within the compartment presented to the outlet 13 is a piston 17 which is connected to a closure member 18 of tubular form. The piston 17 divides its compartment into a closing chamber 19 and an opening chamber 20, the closing chamber being located intermediate the baffle 16 and the piston, and the open end of the opening chamber is closed by a bulkhead 21 which is supported by legs not shown connected to the casing. It will be appreciated that the bulkhead 21 defines with the body 14 an annular space in which the first closure member slides when fluid pressure is applied to its piston.

The chamber 19 is connected to a point downstream of the valve which point is shown adjacent the outlet 13 for convenience, through first passage means 22 so that one side of the first piston is always subjected to the pressure downstream of the valve. Furthermore, the opening chamber 20 is connected by passage means 23 with the output of a pressure regulator 24. This regulator is of any convenient form and is arranged to deliver air at a predetermined pressure, the input to the regulator being obtained from a point upstream of the valve. Thus when the valve is in use, the piston 17 is subjected on one side to a predetermined pressure and on the other side to the pressure pertaining downstream of the valve. If the forces produced by these pressures are unbalanced the piston will move the closure member 18 to either restrict the flow of air between the casing and the body or permit more air to flow and this movement will continue until the forces produced by the pressures acting on the piston are balanced.

Slidable within the compartment which is presented to the inlet 12 end of the casing is a piston 25 which divides this compartment into an opening chamber 26 and a closing chamber 27, the closing chamber being situated intermediate the piston 25 and the baffle 16. Furthermore the second piston is connected by a piston rod 28, of tubular form, to a second closure member 29 having a mushroom shaped head and having an integral skirt portion which is slidable on the periphery of the body. The open end of the opening chamber is closed by a further bulkhead 30 of annular form which is secured to the body 14. Moreover, the space defined intermediate the head of the closure member 29 and the bulkhead 30 is in communication with the upstream side of the valve through an aperture 31 pierced in the head.

Extending from the chambers 26 and 27 are passages 32 and 33 respectively and through one of which air from upstream of the valve can flow when it is required to move the closure member 29. During such movement air flows through the other passage to atmosphere. For controlling the air flow a pair of two-way valves 34 and 35 are provided respectively and they are located within a housing 11.

Valve 34 comprises a double sided valve element which co-operates with one of a pair of spaced seatings between which is defined a chamber which is in communication with the passage 32. On the remote side of the seatings from this chamber are defined further chambers 36 and 37. Chamber 36 is in communication with the atmosphere by way of openings 38 and chamber 37 is in communication with a point upstream of the valve by way of passage 39. Valve 35 comprises an element which is provided with a pair of spaced heads which are located within the chambers 36 and 37 respectively and which can co-operate with seatings between which is located a chamber which is in communication with the passage 33. The elements of the two valves are connected together by a beam 40 mounted on a cylindrical guide 41, the latter being mounted for axial movement within the housing.

At its end remote from the valve elements the guide is secured to a circular spring abutment 42 and a coiled compression spring 43 is provided to load the guide together with the valve elements to the position in which air from upstream of the valve is allowed to enter the chamber 26 of the valve and thereby to cause the closure member 29 to be moved to the open position. When the valve elements are moved to their alternative position air under pressure is admitted to the chamber 27 and the closure member 29 is moved into a seating 44 defined upon the casing about the inlet. Furthermore, when the closure member 29 is on the seating 44 then the closure member 18 is moved to its wide open position since the pressure in the chamber 19 will then be low as compared with the pressure derived from the regulator 24 and contained in the chamber 20.

Mounted within the housing is a pivotable plate 45 and which is provided with an enlongated projection 46 which bears upon the circular spring abutment 42. Moreover, defined within the housing are a pair of cylinders 47, 48 and which contain fluid operable pistons 49, 50 respectively. Cylinder 48 is in communication with a point downstream of the main valve by way of passage 51 and cylinder 47 is in communication with a point upstream of the valve by way of a passage 52. The flow of air through this latter passage is controlled by an operator controlled on/off valve 53.

Considering piston 49, this is of hollow form and accommodates a plunger 54 which is held in engagement with the plate 45 by a coiled compression spring 55. The extent of movement of the piston is limited by an annular ring 56 which is secured within a groove in the wall of the cylinder 47, and the piston supports a spring loaded release member 57 which extends laterally towards the other piston.

Considering piston 50, this is biased by a coiled compression spring 58 in a direction away from the plate 45 and is provided with a stem 59 which extends towards the plate 45. Associated with the stem 59 is a latch mechanism which comprises a pair of plates 60 pivotally mounted in the housing and which are interconnected by three rod like members 61, 62 and 63. The member 63 is acted upon by a coiled compression spring 64 and this serves to bias the plates 60 together with the members 61 and 62 to a position such that the member 61 lies in the path of the release member 57. Moreover, the member 62 bears against a plain portion of the stem 59 but as the piston 50 moves against the action of its spring the member 62 is moved laterally by a cam form defined on the stem 59 against the action of the spring 64. Furthermore, as the piston 50 moves fully against the action of its spring an abutment edge defined on the member 62 in a groove 65 formed in the stem 59 to retain same in this position.

The primary object of the valve is to act as a regulator for the pressure downstream of the valve but the valve can also act as a cut-off valve. In the regulating condition it is desirable that the valve should close if the pressure downstream of the valve should exceed a predetermined value. This value might be exceeded if, for instance, the regulator 24 ceases to function correctly, or if the closure member 18 sticks. The pressure downstream of the valve acts on the piston 50 in opposition to the force exerted by the spring 58. When the pressure exceeds the predetermined value the piston is moved sufficiently against the action of the spring so that the stem 59 contacts the plate 45 and moves the latter to change over the settings of the valve elements 34 and 35. At the same time the abutment edge on the member 62 engages the groove 65 and the piston is retained in this position. The alternative setting of the valve elements 34 and 35 allows air from upstream of the valve to enter the chamber 27 and air is allowed to exhaust from chamber 26. Thus, the closure member 29 is moved into contact with the seating 44 and further flow of air through the valve is prevented.

In order to restore the valve to its working condition the on/off valve 53 is opened and the piston 49 moves into contact with the ring 56. During the movement the release member 57 moves against the action of its spring and positions itself behind the member 61. When the valve 53 is closed the piston 49 is returned to the position shown in FIGURE 2 by spring 55 and the member 61 together with the plates 60 and members 62 and 63, are moved anti-clockwise. This movement moves the abutment edge of the member 62 out of the groove 65 and the piston 50 returns to the position shown in FIGURE 2. At the same time, the plate 45 together with the guide 41 and the valve elements move to the position shown in FIGURE 2 and air is admitted to the chamber 26 and exhausted from the chamber 27 so that the closure member 29 is moved to allow the flow of air through the valve. The above sequence occurs only when the valve has been closed due to fault, and it will be appreciated that if the fault persists then the cycle, if it can be described as such, will be repeated.

It is also essential to be able to close the valve when it is operating correctly. To do this, the on/off valve 53 is opened and the piston 49 moves against the stop ring 56. Moreover, the spring 55 is compressed and a force is exerted on the plate 45 which together with the force exerted by the piston 50 is sufficient to move the plate together with the valve elements 34, 35 to their alternative position thereby to close the valve. It will be noted that the piston 50 remains in the latched position but when the on/off valve is closed the piston 49 releases the latch on the piston and the parts assume the position shown in FIGURE 2.

Although the expression "on/off valve" has been used in connection with the valve 53 it is in fact a two-way valve which permits the cylinder 47 to be exhausted when it is in the off position. Moreover, in a practical arrangement this valve is operated by a solenoid and is housed in the housing 11. The particular arrangement has the advantage that every time the valve is closed or when it is tested the protective arrangements are also tested.

Having thus described my invention what I claim as new and desire to secure by Letters Patent is:

1. A fluid control valve comprising in combination, a casing, an inlet and an outlet defined at opposite ends of the casing, a pair of closure members mounted within the casing and slidable relative thereto to control the flow of fluid through the casing, a pair of double acting pistons operatively connected to said closure members respectively, first passage means through which fluid under pressure from downstream of the valve can be applied to one side of one of said pistons to move the associated closure member to reduce the flow of fluid through the casing, second passage means through which fluid at a predetermined pressure can be applied to the other side of said one piston, so that the magnitude of the pressure downstream of the valve is controlled in accordance with the magnitude of said predetermined pressure, valve means operable to control the application of fluid under pressure to one or the other side of said other piston whereby the associated closure member can be moved to permit or prevent the flow of fluid through the valve, resilient means biasing said valve means into one position in which the closure member associated with said other piston is in a position to permit the flow of fluid through the valve, first fluid pressure operable means responsive to pressure downstream of the valve, said first fluid pressure operable means being arranged to move said valve means to another position against the action of said resilient means when the pressure downstream of the valve exceeds a safe value, latch means operable when said valve means is moved to said other position to retain the valve means in this position, and operator controllable means operable for releasing said latch means.

2. A fluid control valve as claimed in claim 1 in which said first fluid pressure operable means is arranged to exert a force on said valve means when the pressure of fluid downstream of the valve is below said predetermined value, and said operator controllable means comprises a second fluid pressure operable means which can act to move said valve means against the action of the resilient means but said second fluid pressure operable means by itself being incapable of moving said valve means against the action of the resilient means but which with the assistance of said first fluid pressure operable means, can move the valve means to said other position even when the pressure downstream of the valve is below said predetermined value.

3. A fluid control valve as claimed in claim 2 including an operator controlled on/off valve which controls the supply of fluid under pressure to said second fluid pressure operable means.

4. A fluid control valve as claimed in claim 3 in which said first and second fluid pressure operable means comprises pistons which are accommodated within cylinders respectively.

5. A fluid control valve as claimed in claim 4 in which the piston of the second fluid pressure operable means acts on the valve means through a coiled compression spring.

6. A fluid control valve as claimed in claim 5 in which the piston of the second fluid pressure operable means carries a release member which releases said latch means during the return movement of the piston.

References Cited
UNITED STATES PATENTS 3,276,468    10/1966    Lebow _____ 137—220 XR WILLIAM F. O'DEA, *Primary Examiner.*

H. W. WEAKLEY, *Assistant Examiner.*